United States Patent
Yoshida et al.

(10) Patent No.: US 10,843,733 B2
(45) Date of Patent: Nov. 24, 2020

(54) VEHICLE BODY STRUCTURE

(71) Applicant: HONDA MOTOR CO., LTD., Tokyo (JP)

(72) Inventors: Masayasu Yoshida, Wako (JP); Yuya Abe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 92 days.

(21) Appl. No.: 16/254,934

(22) Filed: Jan. 23, 2019

(65) Prior Publication Data

US 2019/0225272 A1 Jul. 25, 2019

(30) Foreign Application Priority Data

Jan. 25, 2018 (JP) .................................. 2018-010177

(51) Int. Cl.
  *B62D 21/15* (2006.01)
  *B62D 25/08* (2006.01)
  (Continued)

(52) U.S. Cl.
  CPC ........... *B62D 21/152* (2013.01); *B62D 21/03* (2013.01); *B62D 25/08* (2013.01);
  (Continued)

(58) Field of Classification Search
  CPC ...... B62D 21/152; B62D 21/03; B62D 25/08; B62D 25/2018; B62D 25/2045; B62D 25/025; B62D 25/145; B62D 25/20
  See application file for complete search history.

(56) References Cited

U.S. PATENT DOCUMENTS

| 8,585,134 B2 | 11/2013 | Yasui et al. |
| 2009/0146455 A1* | 6/2009 | Honji ................... B62D 25/081 296/187.09 |

(Continued)

FOREIGN PATENT DOCUMENTS

| JP | H08-175429 A | 7/1996 |
| JP | 2009-173047 A | 8/2009 |

(Continued)

OTHER PUBLICATIONS

Japanese Office Action with English translation dated Aug. 6, 2019. (6 pages).

*Primary Examiner* — Lori L Lyjak
(74) *Attorney, Agent, or Firm* — Rankin, Hill & Clark LLP

(57) ABSTRACT

A vehicle body structure includes: a pair of front side frames disposed on a front side of a vehicle to be in parallel with each other along a vehicle front-rear direction; lower members and gussets (load receiving portions) disposed at front ends in the vehicle front-rear direction of the front side frames so as to extend outward in a vehicle width direction; front wheels disposed outward in the vehicle width direction of the front side frames; and right and left side sills extending in the vehicle front-rear direction. Vehicle-width-direction outer end portions of the load receiving portions are positioned outward in the vehicle width direction of vehicle-width-direction inner end portions of the front wheels, and vehicle-width-direction outer end portions of the front wheels are positioned outward in the vehicle width direction of vehicle-width-direction inner end portions of front ends in the vehicle front-rear direction of the side sills.

8 Claims, 13 Drawing Sheets

(51) Int. Cl.
  *B62D 21/03*  (2006.01)
  *B62D 25/20*  (2006.01)
  B62D 25/02  (2006.01)
  B62D 25/14  (2006.01)

(52) U.S. Cl.
  CPC ..... *B62D 25/2018* (2013.01); *B62D 25/2045* (2013.01); *B62D 25/025* (2013.01); *B62D 25/145* (2013.01); *B62D 25/20* (2013.01)

(56) References Cited

U.S. PATENT DOCUMENTS

| | | | |
|---|---|---|---|
| 2014/0035325 A1* | 2/2014 | Naito | B62D 25/085 296/203.02 |
| 2016/0152273 A1 | 6/2016 | Kuriyama et al. | |
| 2017/0113726 A1* | 4/2017 | Matsushima | B60R 19/34 |

FOREIGN PATENT DOCUMENTS

| | | |
|---|---|---|
| JP | 2010-184706 A | 8/2010 |
| JP | 2012-067630 A | 4/2012 |
| JP | 2013-169806 A | 9/2013 |
| JP | 2015-009712 A | 1/2015 |
| JP | 5670246 B2 | 2/2015 |
| WO | 2012/102067 A1 | 6/2014 |

\* cited by examiner

VEHICLE BODY STRUCTURE

BACKGROUND OF THE INVENTION

1. Field of the Invention

The present invention relates to vehicle body structures for vehicles, such as automobiles.

2. Description of the Related Art

For example, Patent Literature 1 discloses a vehicle body structure having an improved performance to absorb the collision load in the case of what is called a narrow offset collision. The small overlap collision (narrow offset collision) refers to the case where, for example, a collision object, such as an oncoming vehicle, hits offset to the right or left front end of the vehicle, and a front side frame or the bumper beam of the collision object, such as the oncoming vehicle, collides with the front end of a side sill of the vehicle body via a front wheel.

PRIOR ART(S)

Patent Literature(s)

Patent Literature 1: JP5670246B

SUMMARY OF THE INVENTION

The vehicle body structure disclosed in Patent Literature 1 is capable of absorbing the collision load in the case of a small overlap collision (narrow offset collision) by the front end of the side sill being crushed. Unfortunately, the vehicle body structure disclosed in Patent Literature 1 requires reinforcement frames on the floor. Thus, it may be difficult to apply this structure to electric automobiles having a battery on the floor.

Note that the small overlap collision test (narrow offset collision test) refers to a test in which approximately half of the width of the offset collision (approximately one fourth of the width of the front face of the vehicle body) is made to collide with a barrier. This test assumes a collision with not only an oncoming vehicle but also, for example, a corner of a building, and a narrow object such as a tree or a utility pole.

The present invention has been made from the above viewpoint, and an object thereof is to provide a vehicle body structure capable of protecting the battery disposed on the floor in the case of a small overlap collision.

To achieve the object, a vehicle body structure according to the present invention includes: a pair of front side frames disposed on a front side of a vehicle to be in parallel with each other along a vehicle front-rear direction; load receiving portions disposed at front ends in the vehicle front-rear direction of the respective front side frames so as to extend outward in a vehicle width direction; front wheels disposed outward in the vehicle width direction of the respective front side frames; and a pair of right and left side sills disposed rearward in the vehicle front-rear direction of the respective front wheels so as to extend in the vehicle front-rear direction. Vehicle-width-direction outer end portions of the load receiving portions are positioned outward in the vehicle width direction of vehicle-width-direction inner end portions of the respective front wheels, and vehicle-width-direction outer end portions of the front wheels are positioned outward in the vehicle width direction of vehicle-width-direction inner end portions of front ends in the vehicle front-rear direction of the respective side sills.

The present invention provides the vehicle body structure capable of protecting the battery disposed on the floor in the case of a small overlap collision.

DETAILED DESCRIPTION OF THE EMBODIMENTS

Next, an embodiment of the present invention will be described in detail with reference to the drawings as necessary. Note that in each figure, "front-rear" indicates the vehicle front-rear direction; "right-left", the vehicle width direction (right-left direction); and "upper-lower", the vertically upper-lower direction.

Figure 1:
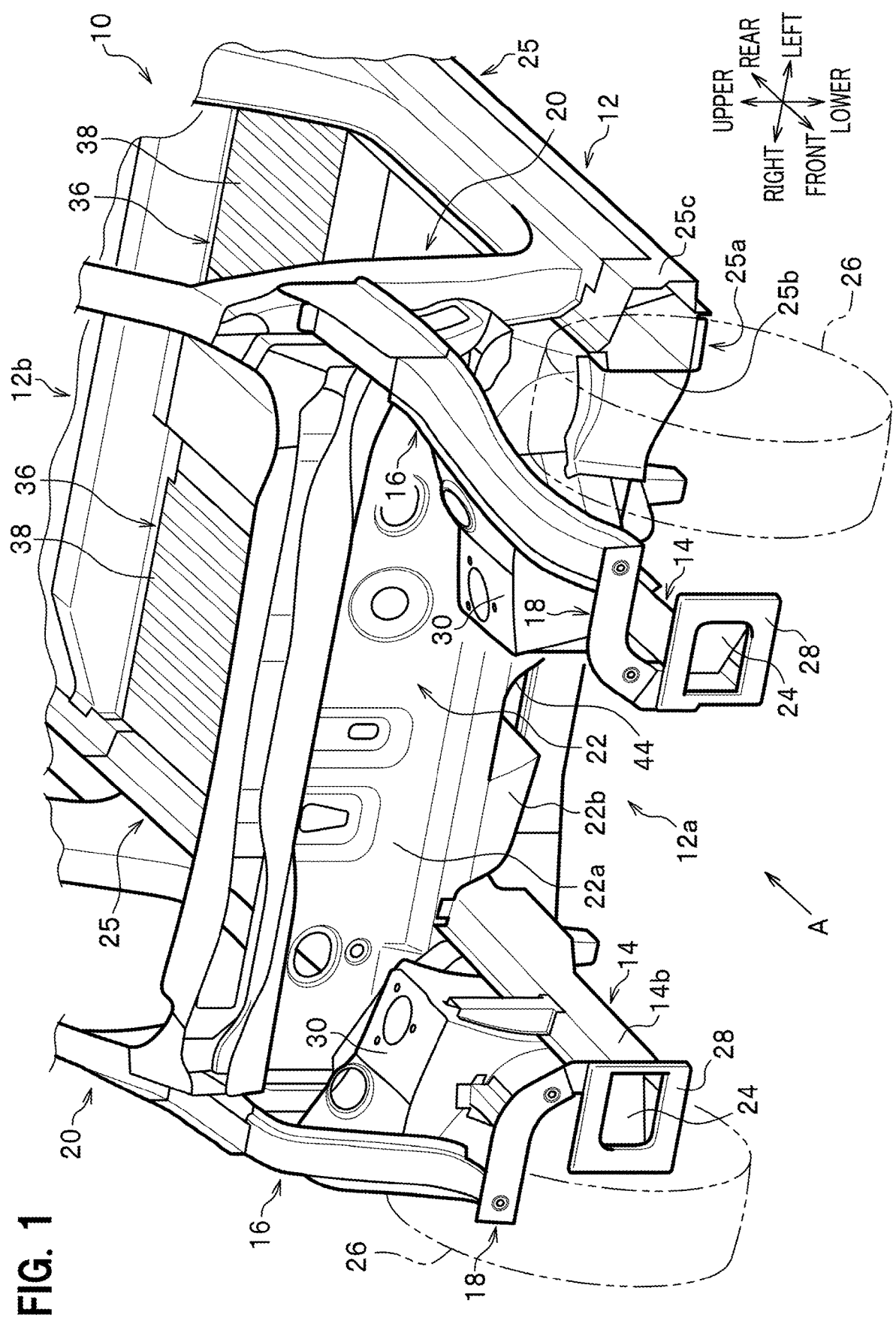
FIG. 1 is a perspective view of an electric automobile to which a vehicle body structure according to an embodiment of the present invention is applied.

As shown in FIG. 1, an electric automobile (vehicle) 10 to which a vehicle body structure according to an embodiment of the present invention is applied has a vehicle frame 12. This vehicle frame 12 includes a vehicle frame front portion 12a and a battery storing portion 12b for storing a battery which is an electrical component and is stored rearward of the vehicle frame front portion 12a in the vehicle front-rear direction.

Note that electrical components are not limited to the battery but include, for example, fuel cells. Vehicles to which a vehicle body structure according to this embodiment is applicable are not limited to electric automobiles 10, but the vehicle body structure according to this embodiment is applicable to, for example, ordinary automobiles driven by internal combustion engines.

Figure 2:
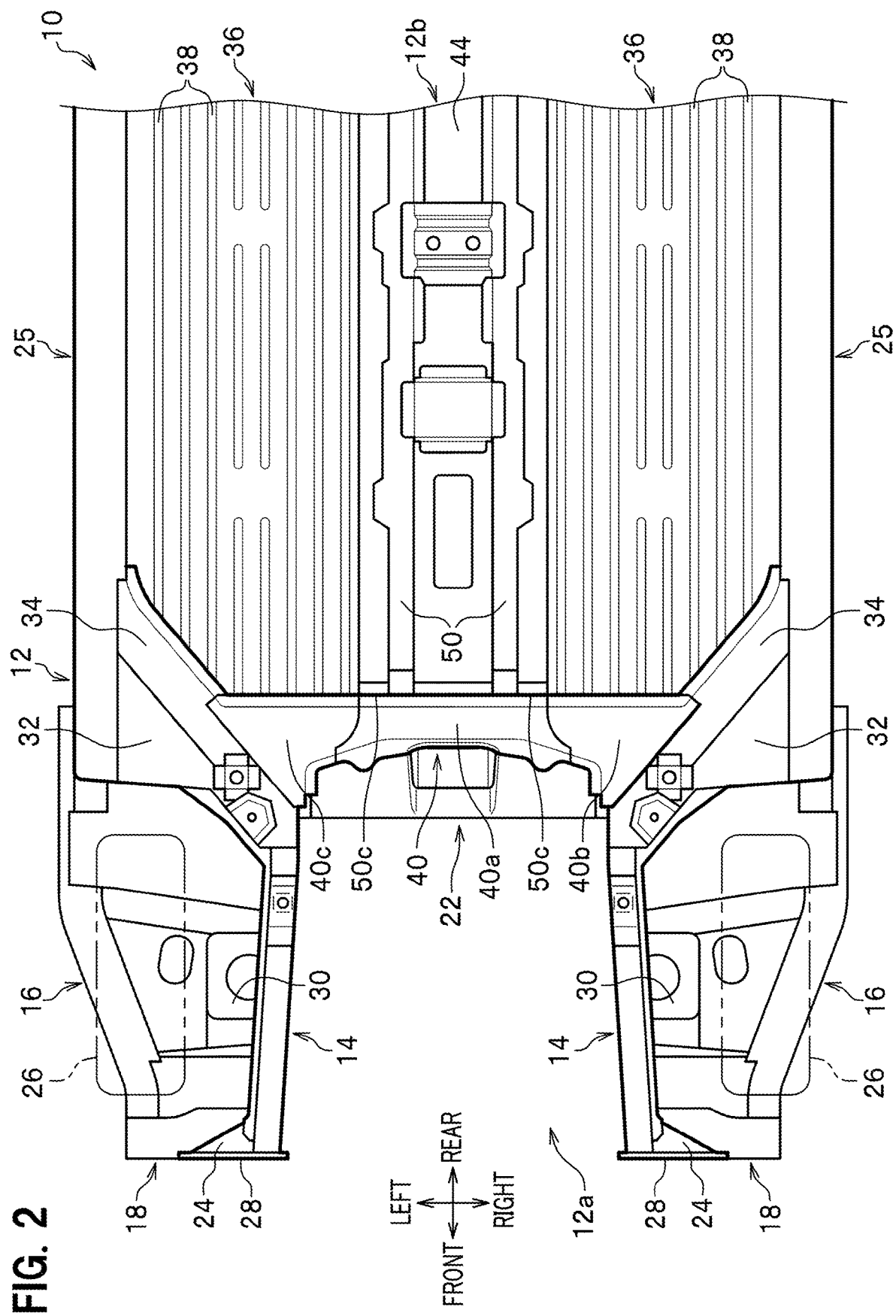
FIG. 2 is a bottom view of the electric automobile shown in FIG. 1.
Figure 3:
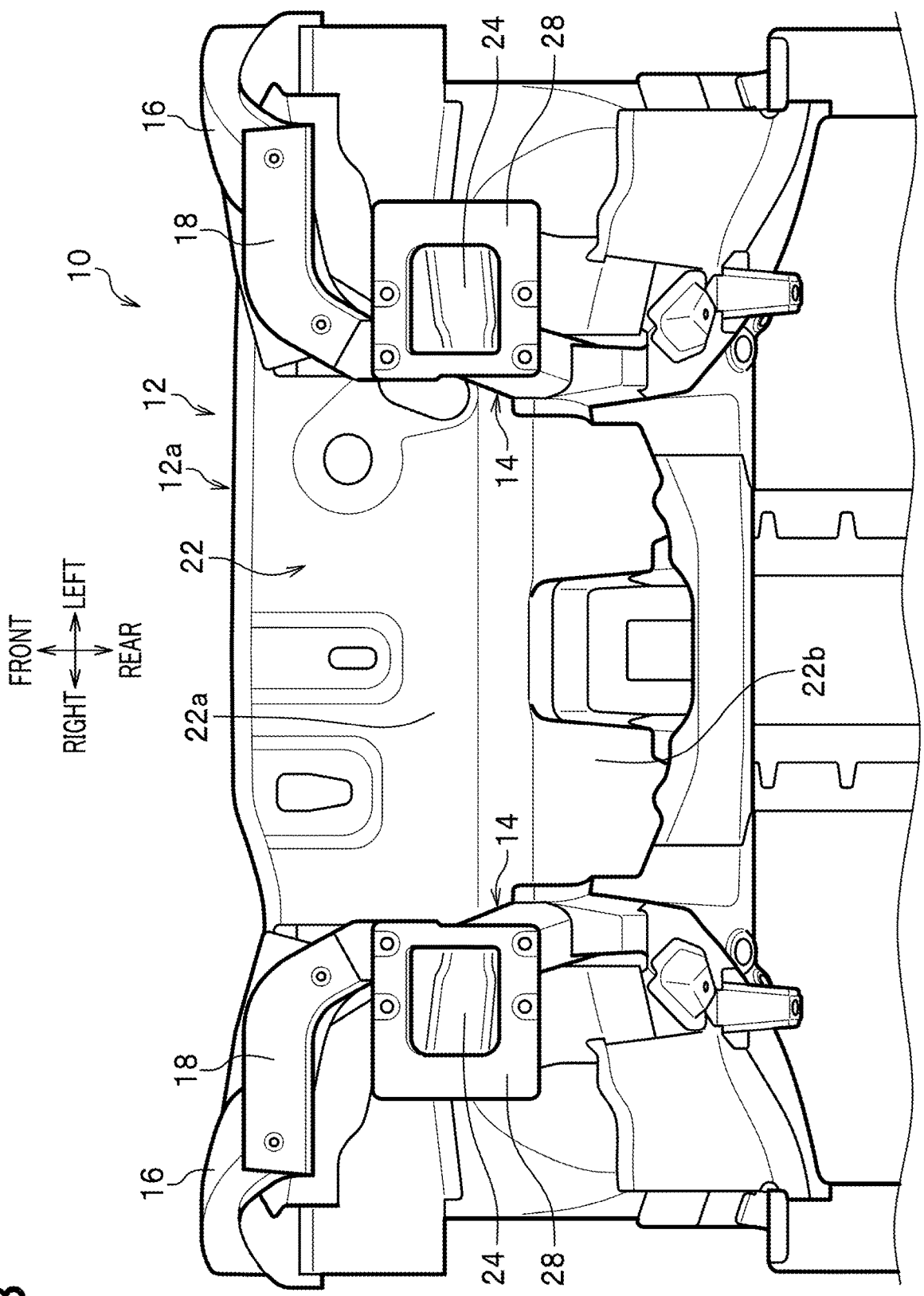
FIG. 3 is a front view from the arrow A direction in FIG. 1.

As shown in FIGS. 1 to 3, the vehicle frame front portion 12a includes a pair of right and left front side frames 14, 14; a pair of right and left upper members 16, 16; and a pair of right and left lower members 18, 18. The vehicle frame front portion 12a also has a pair of right and left front pillars 20, 20; a dash lower panel (dash board lower) 22; a pair of right and left gussets 24, 24; and a pair of right and left side sills 25, 25. The lower members 18 and the gussets 24 function as "load receiving portions" stated in claims as described later. Outward in the vehicle width direction of the front side frames 14 are disposed a pair of right and left front wheel 26, 26.

At the front ends of the front side frames 14 are coupled via the gussets 24 a pair of right and left attachment plates 28, 28 extending outward in the vehicle width direction. To the attachment plates 28 are attached bumper beam extensions (not shown). Attached to the pair of right and left bumper beam extensions (not shown) is a bumper beam (not shown) extending in the vehicle width direction.

As shown in FIG. 2, the pair of right and left front side frames 14, 14 extend in parallel along the vehicle front-rear direction. Each front side frame 14 includes an inner wall 14a (see FIG. 5) disposed inward in the vehicle width direction and an outer wall 14b (see FIG. 6) disposed outward in the vehicle width direction and has a closed cross section inside. The inner wall 14a has an upper flange and a lower flange at its upper and lower ends, respectively. The outer wall 14b has an upper flange and a lower flange at its upper and lower ends, respectively. Each front side frame 14 is formed of the inner wall 14a and the outer wall 14b integrally bonded by joining together the upper and lower flanges of the inner wall 14a and the upper and lower flanges of the outer wall 14b.

As shown in FIGS. 1 and 2, at the front end in the vehicle front-rear direction of each front side frame 14 is disposed a gusset 24. The rear end in the vehicle front-rear direction of each front side frame 14 is joined to a lower portion of the dash lower panel 22 extending along the vehicle width direction, and is also coupled to a load diverting transmission portion described later.

Figure 5:
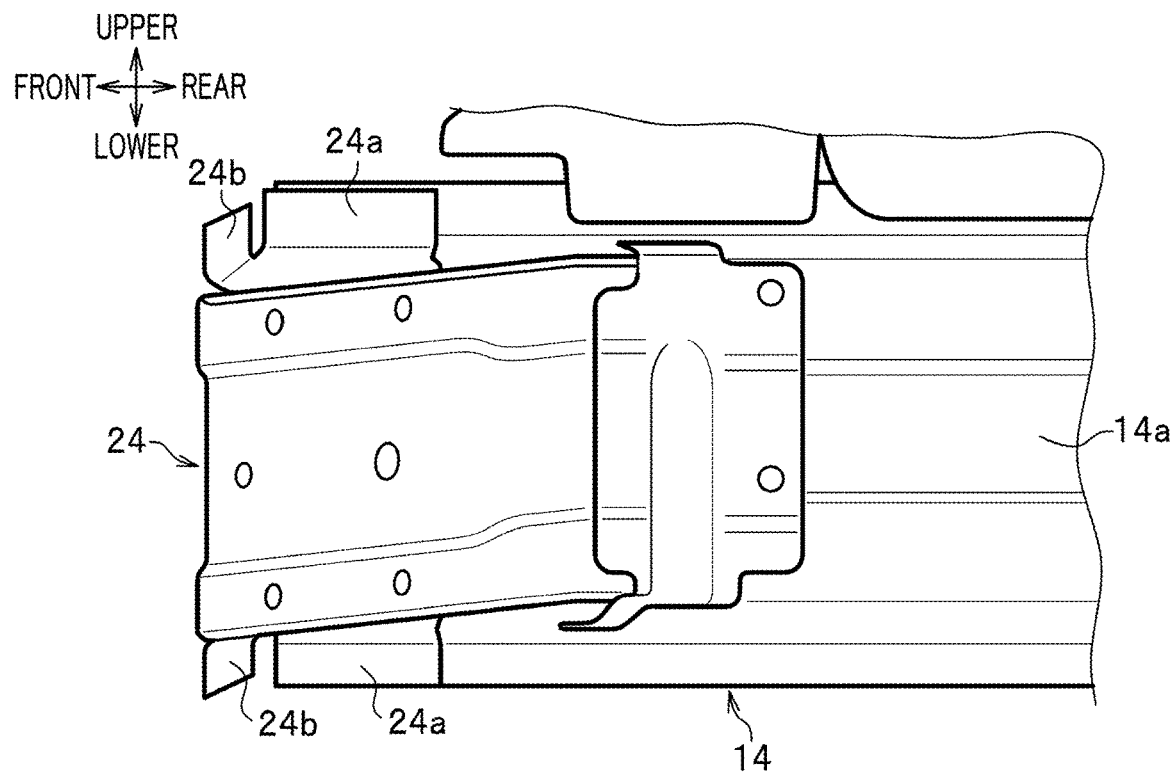
FIG. 5 is a perspective view of a gusset joined to the inner wall of a front side frame.
Figure 6A:
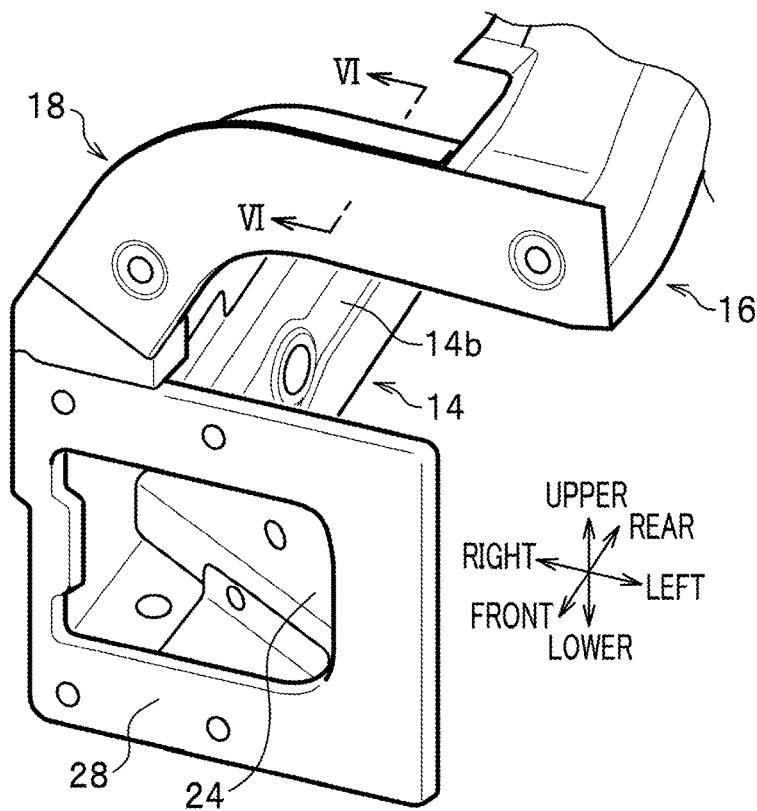
FIG. 6A is a perspective view of the gusset and a lower member.

As shown in FIG. 5, each gusset 24 has a rectangular shape in front view and extends, in a plan view, obliquely frontward in the vehicle front-rear direction from the inside toward the outside in the vehicle width direction. This gusset 24 has a first joint flange portion 24a which is joined to the front side frame 14 and a second joint flange portion 24b which is joined to the attachment plate 28. The first joint flange portion 24a includes an upper flange provided at the upper end of the gusset 24 and a lower flange provided at the lower end of the gusset 24. The second joint flange portion 24b includes an upper flange provided at the upper end of the gusset 24 and a lower flange provided at the lower end of the gusset 24.

The first joint flange portion 24a is disposed between the upper and lower flanges of the inner wall 14a and the upper and lower flanges of the outer wall 14b, and those three parts—the first joint flange portion 24a, the upper and lower flanges of the inner wall 14a, and the upper and lower flanges of the outer wall 14b—are joined integrally. The first joint flange portion 24a extends in the vehicle front-rear direction along the inner side face of the front side frame 14. The second joint flange portion 24b extends along the vehicle width direction. The inner portion in the vehicle width direction of the gusset 24 is positioned inside the closed cross section formed of the inner wall 14a and the outer wall 14b at the front end in the vehicle front-rear direction of the front side frame (see FIGS. 14B and 15B).

Figure 6B:
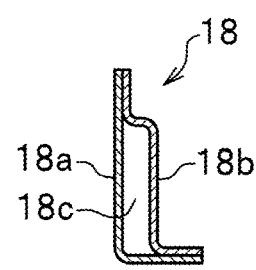
FIG. 6B is an end view taken along line VI-VI in FIG. 6A.
Figure 7:
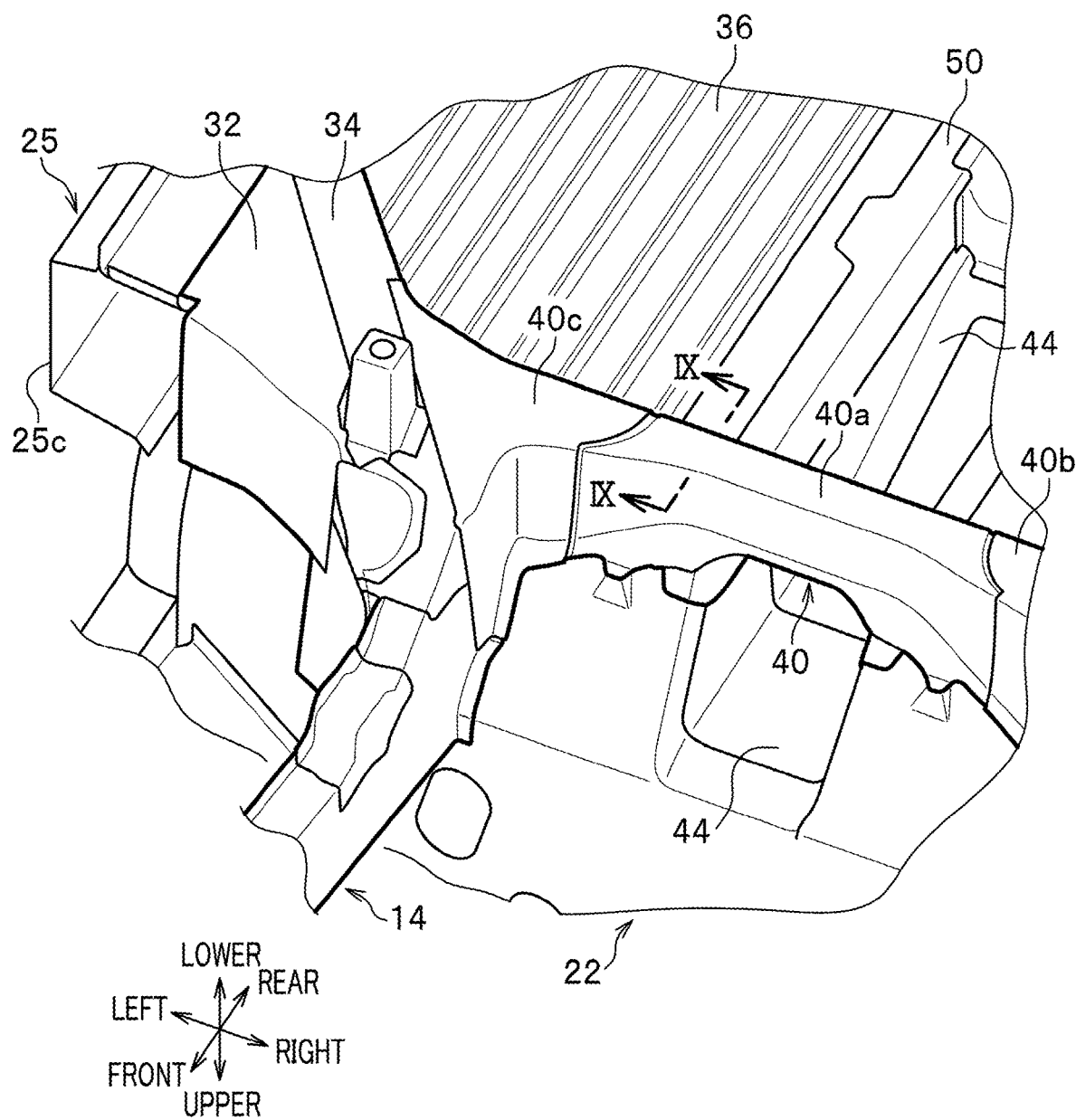
FIG. 7 is a partially broken perspective view of the electric automobile shown in FIG. 1.
Figure 8:
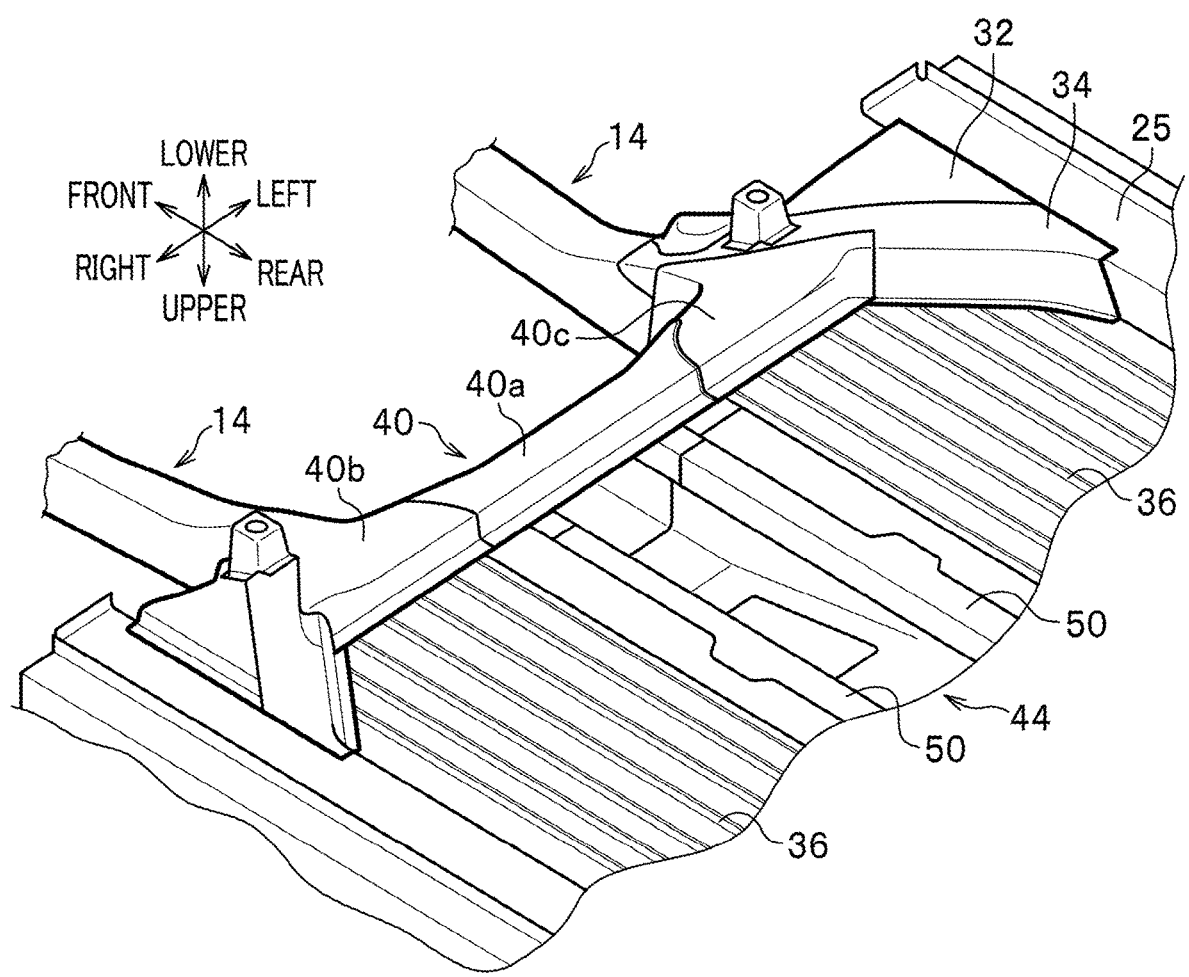
FIG. 8 is a perspective view of a tunnel cross member from the bottom side of the vehicle body.

Each lower member 18 has an L shape in front view (see FIG. 3). This lower member 18 extends upward from the front end in the vehicle front-rear direction of the front side frame 14 and then outward in the vehicle width direction, and is coupled (bonded) to the front end in the vehicle front-rear direction of the upper member 16 extending forward from the front pillar 20. As shown in FIG. 6B, the lower member 18 has a front wall 18a located forward in the vehicle front-rear direction and a rear wall 18b located rearward in the vehicle front-rear direction, between which is formed a closed cross section 18c.

Figure 4A:
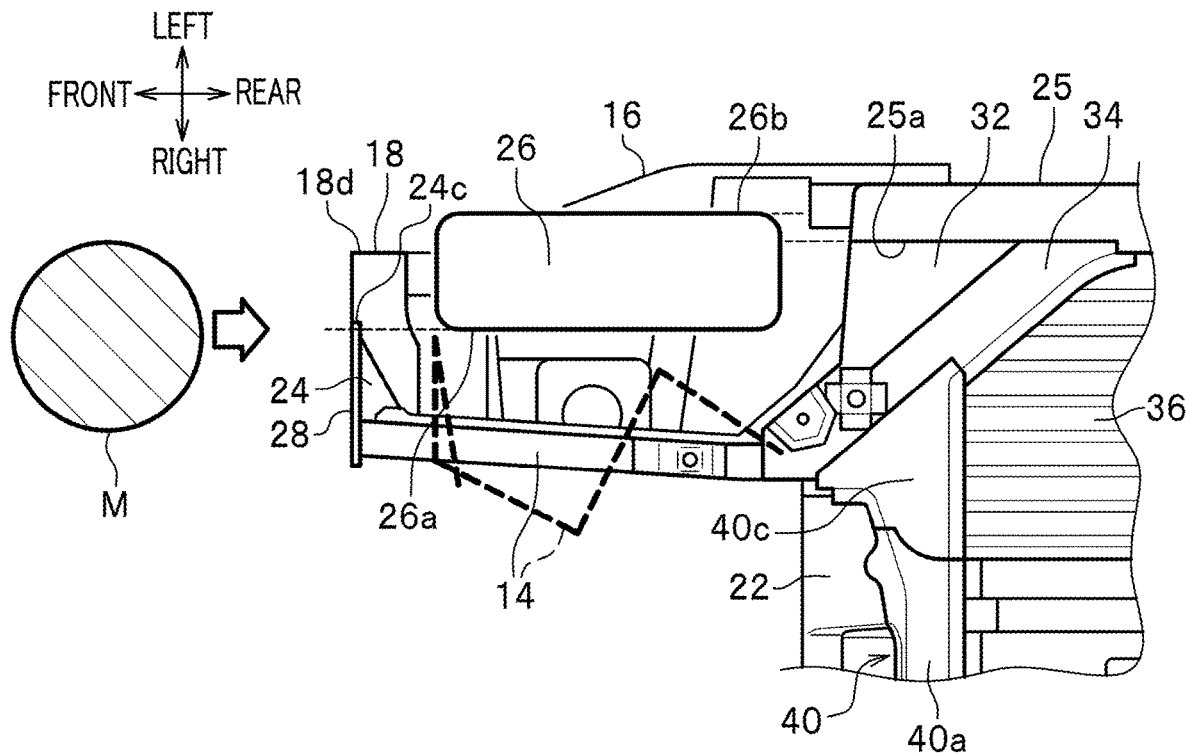
FIG. 4A is a partially enlarged bottom view showing the movement in the case of a small overlap collision and also showing the positional relationship in the vehicle width direction.

As shown in FIG. 4A, in bottom view, the vehicle-width-direction outer end portion 18d of the lower member 18 and the vehicle-width-direction outer end portion 24c of the gusset 24 are positioned outward in the vehicle width direction of the vehicle-width-direction inner end portion 26a of the front wheel 26 in the vehicle width direction. The vehicle-width-direction outer end portion 26b of the front wheel 26 is positioned outward in the vehicle width direction of the vehicle-width-direction inner end portion 25a of the side sill 25 at its front end in the vehicle front-rear direction.

As shown in FIG. 2, the upper members 16 are disposed outward in the vehicle width direction of the pair of right and left front side frames 14, 14, respectively. The front end in the vehicle front-rear direction of each upper member 16 is coupled to the outer end portion 18d in vehicle width direction of the lower member 18. The rear end in the vehicle front-rear direction of each upper member 16 is coupled to the front pillar 20 (see FIG. 1).

In a plan view, between each front side frame 14 and the corresponding upper member 16 is disposed a dumper base 30 for supporting a not-illustrated damper (not shown) fastened to it (see FIGS. 1 and 2).

Each side sill 25 is disposed rearward in the vehicle front-rear direction of the corresponding front wheel 26 and extends along the vehicle front-rear direction. This side sill 25 is formed of a side sill inner 25b located inward in the vehicle width direction and a side sill outer 25c located outward in the vehicle width direction, integrally bonded via their flanges (see FIG. 10). To the inner wall in the vehicle width direction of the side sill inner 25b is coupled the rear end portion in the vehicle front-rear direction of a second outrigger 34 described later and the outer end portion in the vehicle width direction of a first outrigger 32 described later.

Figure 12:
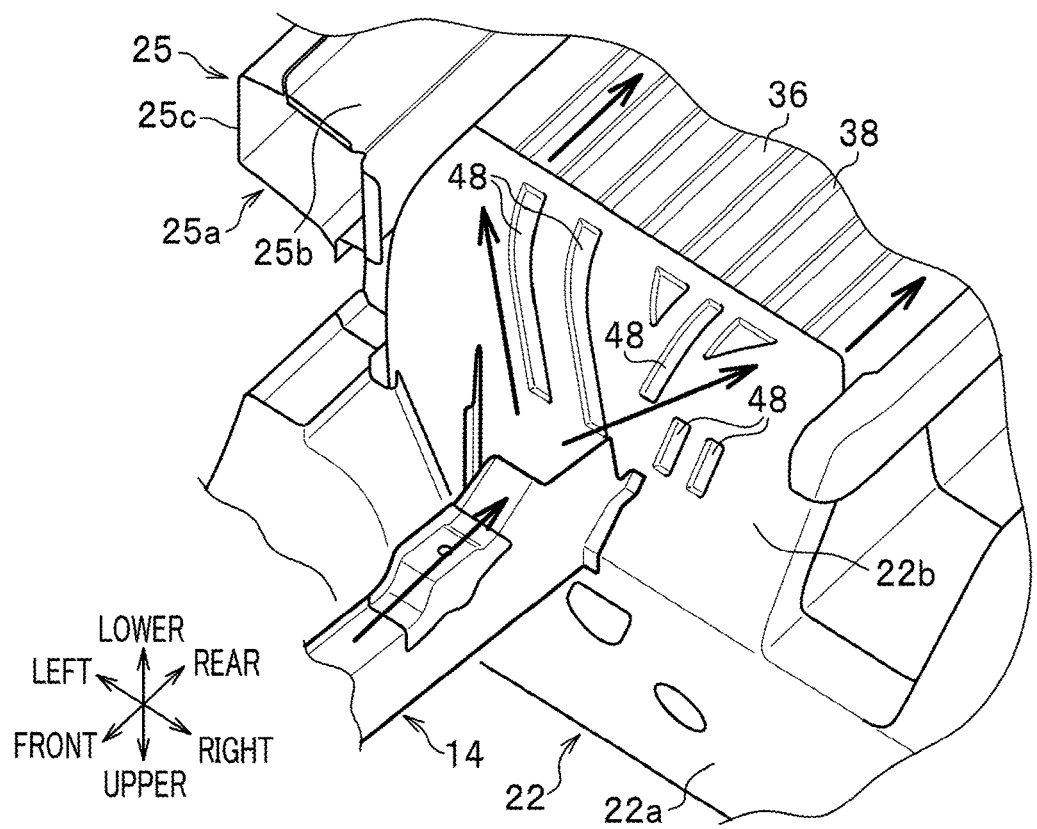
FIG. 12 is a perspective view showing a collision load transmitted from the front side frame being distributed along each bead.

As shown in FIGS. 1 and 3, the dash lower panel 22 has a vertical wall portion 22a extending along a vertical direction and an inclined face portion 22b extending from the lower end of the vertical wall portion 22a and inclined toward the rear of the vehicle. The inclined face portion 22b of the dash lower panel 22 has multiple beads 48 extending radially from the rear end in the vehicle front-rear direction of the front side frame 14 toward the front end in the vehicle front-rear direction of a floor panel 36 (see FIG. 12). The bead 48 is formed, for example, as a recess recessed downward from the floor panel 36.

As shown in FIG. 2, the vehicle frame front portion 12a further has a tunnel cross member 40, a pair of right and left first outriggers 32, 32, and a pair of right and left second outriggers 34, 34. The tunnel cross member 40, the pair of right and left second outriggers 34, 34, and the pair of right and left first outriggers 32, 32 are disposed between, along the vehicle width direction, the front end portions in the vehicle front-rear direction of the pair of right and left side sills 25, 25, and connect the front end portions in the vehicle front-rear direction of the pair of right and left side sills 25, 25.

The tunnel cross member 40 is located below the dash lower panel 22 and extends linearly along the vehicle width direction. In bottom view, this tunnel cross member 40 is formed of integrally coupled three members: a cross center portion 40a disposed at the center in the vehicle width direction, and a right end portion 40b and a left end portion 40c disposed at both right and left ends in the vehicle width direction of the cross center portion 40a.

Figure 9:
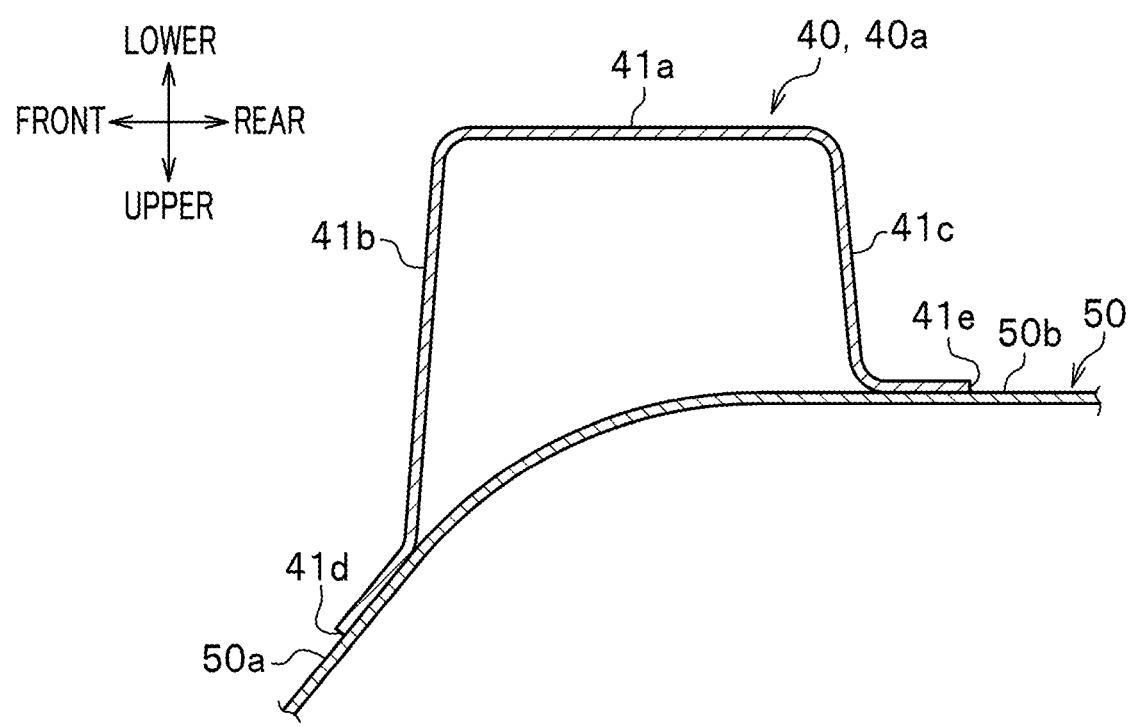
FIG. 9 is an end view taken along line IX-IX in FIG. 7.

As shown in FIG. 9, the cross center portion 40a has a hat-shaped cross section perpendicular to its axis and has a bottom wall 41a, front wall 41b, rear wall 41c, front flange portion 41d, and rear flange portion 41e. The front wall 41b and the rear wall 41c are formed to extend upward from the front end and rear end in the vehicle front-rear direction of the bottom wall 41a, respectively. The front flange portion 41d is formed to extend from the upper end of the front wall 41b obliquely toward the front of the vehicle. The rear flange portion 41e is formed to extend from the upper end of the rear wall 41c and be bent toward the rear of the vehicle. This front flange portion 41d is fixed to an inclined face portion 50a of a tunnel frame 50 described later which has the same cross-sectional shape. The rear flange portion 41e is fixed to a lower face portion 50b of the tunnel frame 50 described later which has the same cross-sectional shape.

As shown in FIG. 2, each of the right end portion 40b and the left end portion 40c has a triangular shape in bottom view and couples the rear end portion in the vehicle front-rear direction of the front side frame 14, the front end portion in the vehicle front-rear direction of the second outrigger 34, and an end portion in the vehicle width direction of the cross center portion.

Figure 10:
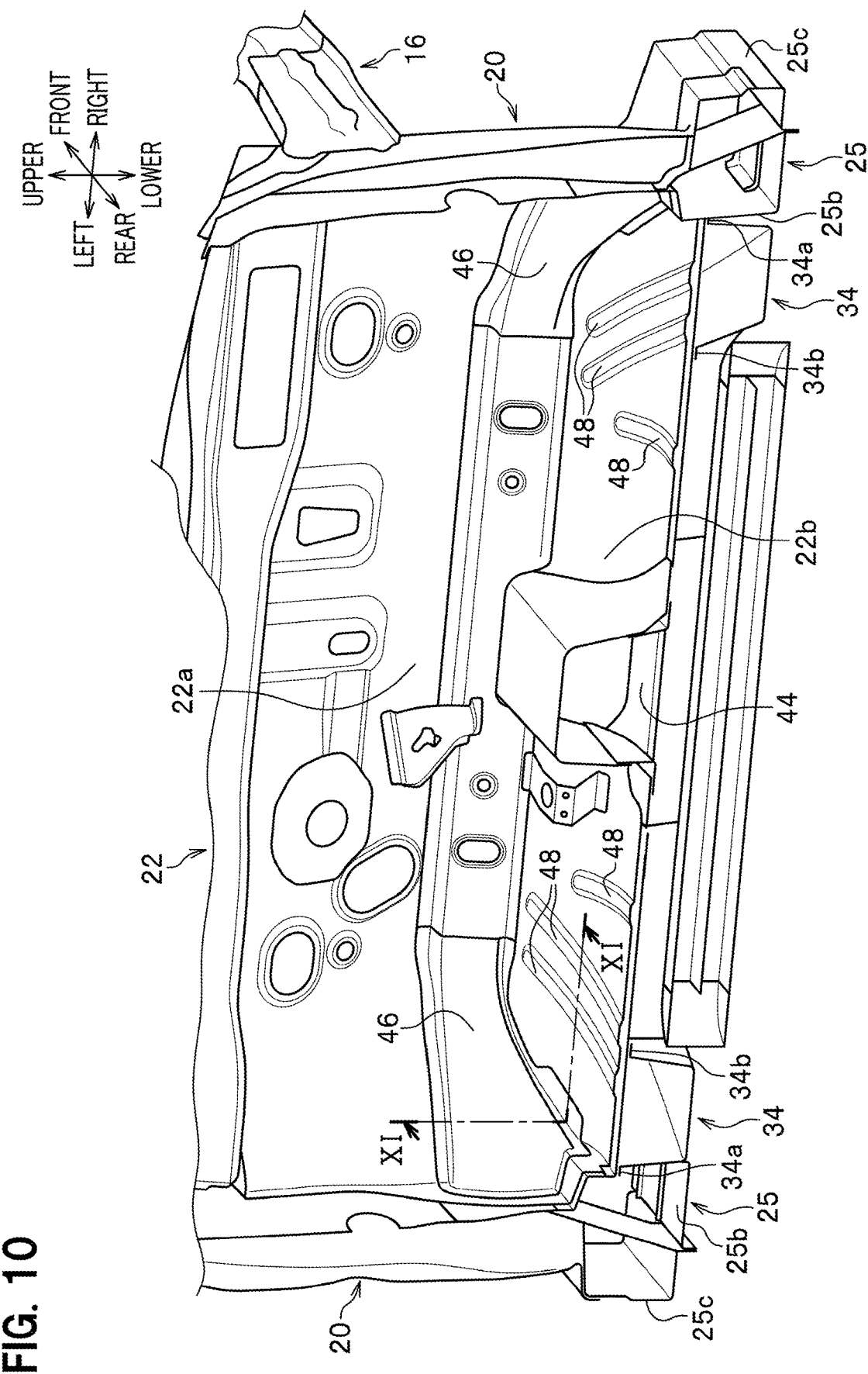
FIG. 10 is a perspective view of a dash lower panel from the inside of the vehicle compartment.
Figure 11:
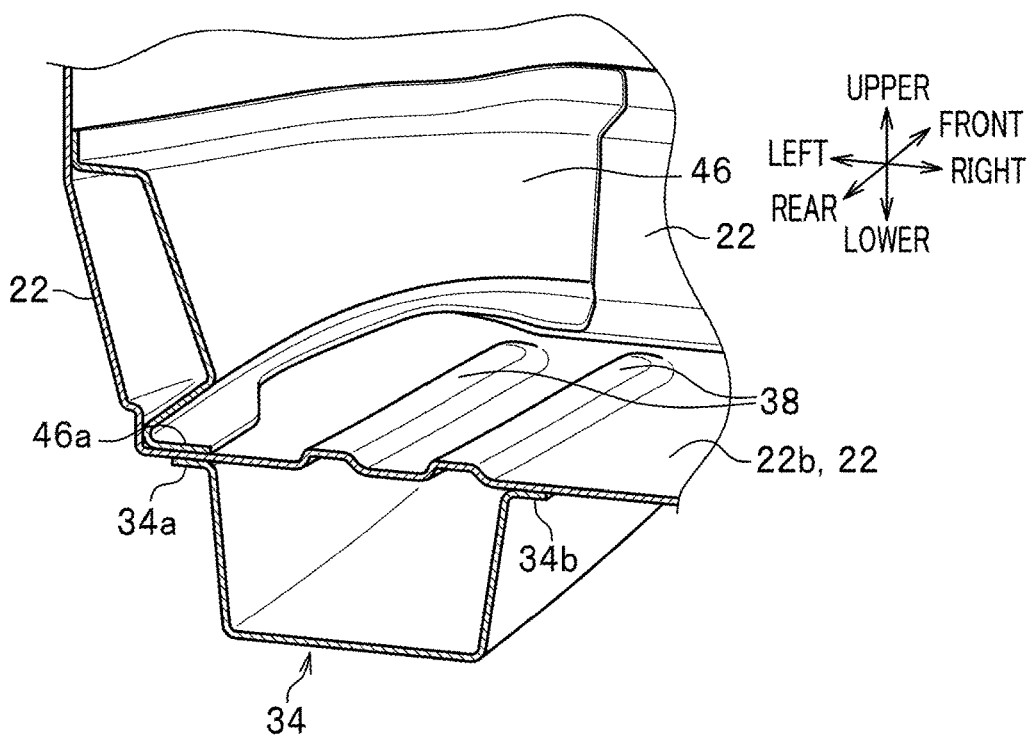
FIG. 11 is a partially broken perspective view showing the relationship between a dash cross member and a second outrigger.

As shown in FIG. 2, each second outrigger 34 extends linearly and obliquely rearward from the rear end portion in the vehicle front-rear direction of the corresponding front side frame 14 to the inner side in the vehicle width direction of the corresponding side sill 25. The front end portion in the vehicle front-rear direction of each second outrigger 34 is coupled to the rear end portion in the vehicle front-rear direction of the corresponding front side frame 14. As shown in FIG. 10, the rear end portion in the vehicle front-rear direction of each second outrigger 34 is coupled to the inner wall in the vehicle width direction of the corresponding side sill 25. As shown in FIG. 11, each second outrigger 34 has an approximately hat-shaped cross section perpendicular to its axis and has an outer flange 34a in the vehicle width direction and an inner flange 34b in the vehicle width direction. The second outrigger 34 is fixed to the lower faces of the dash lower panel 22 and the floor panel 36 via both outer and inner flanges 34a and 34b in the vehicle width direction.

As shown in FIG. 2, each first outrigger 32 has a triangular shape in bottom view and is disposed forward of the second outrigger 34 in the vehicle front-rear direction. The outer end portion in the vehicle width direction of the first outrigger 32 is coupled to the front end portion in the vehicle front-rear direction of the side sill 25.

As shown in FIG. 2, the battery storing portion 12b has a battery pack mounting frame (not shown), a pair of right and left floor panels 36, 36, a floor tunnel 44, and a pair of right and left dash cross members 46, 46 (see FIG. 10). This battery pack mounting frame includes a box portion for storing one or multiple battery packs inside.

The floor panels 36 are disposed on both right and left sides in the vehicle width direction of the floor tunnel 44. The floor panel 36 has multiple beads 38 extending in the vehicle front-rear direction. These multiple beads 38 extend from the front end portion to the rear end portion in the vehicle front-rear direction of the floor panel 36.

The floor tunnel 44 extends along the vehicle front-rear direction at the center in the vehicle width direction. At the connected portions between the floor tunnel 44 and the floor panels 36 are disposed in parallel a pair of right and left tunnel frames 50 extending linearly along the vehicle front-rear direction. Each tunnel frame 50 has an L shaped cross section perpendicular to its axis.

The front end portion 50c in the vehicle front-rear direction of each tunnel frame 50 is positioned above the cross center portion 40a of the tunnel cross member 40 and fixed to the cross center portion 40a.

As shown in FIG. 9, the front flange portion 41d in the vehicle front-rear direction of the tunnel cross member 40 extends obliquely upward along the dash lower panel 22 and is fixed to the inclined face portions 50a of the tunnel frames 50. The rear flange portion 41e in the vehicle front-rear direction of the tunnel cross member 40 is fixed to the lower face portions 50b, which are flat, of the tunnel frames 50.

As shown in FIG. 10, above the second outrigger 34 in the vehicle up-down direction is disposed the dash cross member 46 extending in parallel with the second outrigger 34 in the up-down direction. Inside the vehicle compartment, the dash cross member 46 extends from the rear end portion in the vehicle front-rear direction of the front side frame 14 obliquely rearward to the inner side in the vehicle width direction of the corresponding side sill 25. This dash cross member 46 is fixed to the dash lower panel 22.

Figure 13:
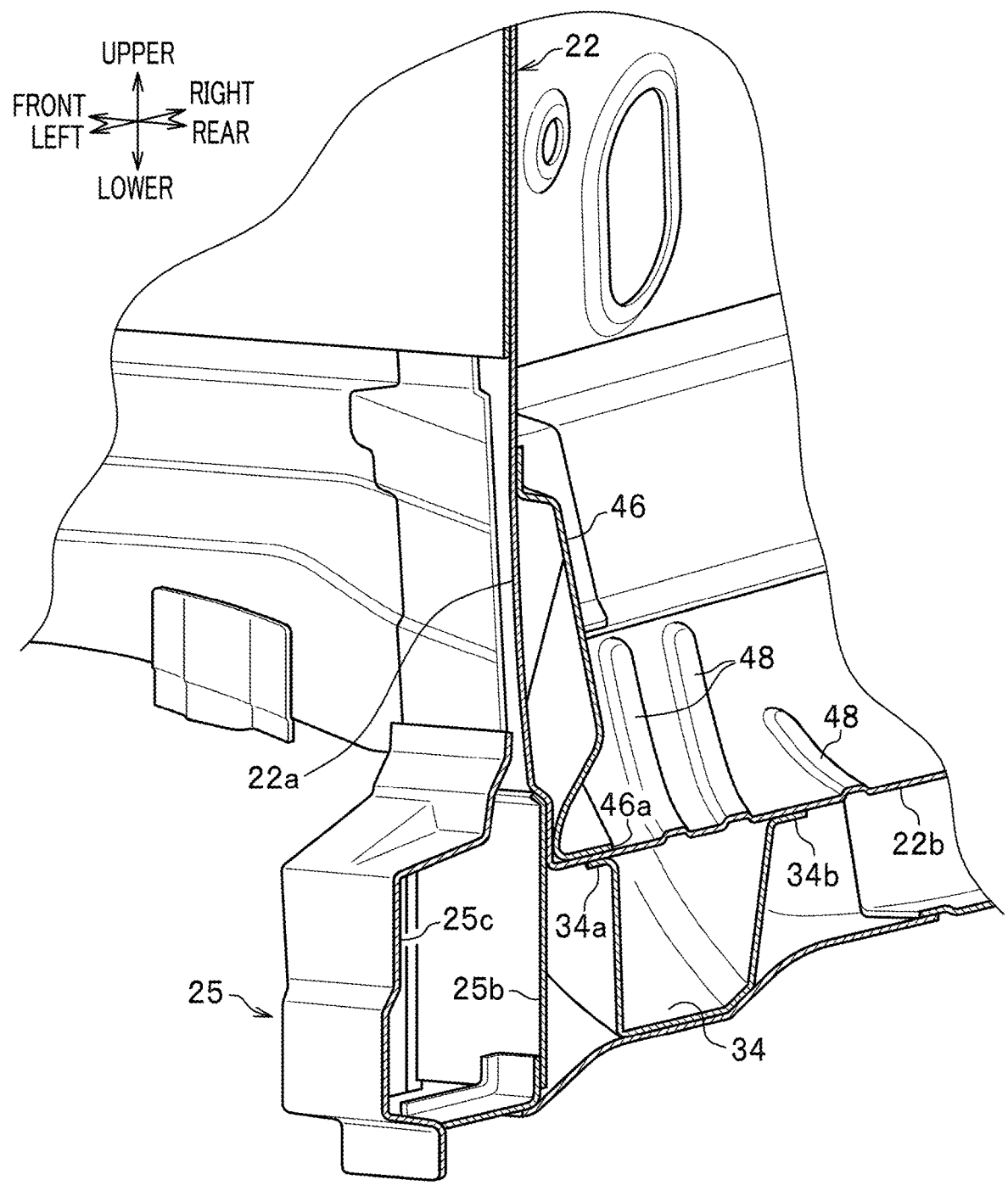
FIG. 13 is a broken perspective view showing the relationship among a side sill, the dash lower panel, and the dash cross member.

As shown in FIGS. 11 and 13, an outer flange 34a in the vehicle width direction of the second outrigger 34 and a lower flange 46a in the vehicle up-down direction of the dash cross member 46 are overlapped in the vehicle width direction via the dash lower panel 22, and both are attached to the dash lower panel 22.

The electric automobile 10 to which the vehicle body structure according to this embodiment is applied is basically configured as described above, and next, description will be provided for the operational advantages.

In this embodiment, in bottom view as shown in FIG. 4A, the vehicle-width-direction outer end portion 18d of the lower member 18 and the vehicle-width-direction outer end portion 24c of the gusset 24 are positioned outward in the vehicle width direction of the vehicle-width-direction inner end portion 26a of the front wheel 26. In addition, in this embodiment, the vehicle-width-direction outer end portion 26b of the front wheel 26 is positioned outward in the vehicle width direction of the vehicle-width-direction inner end portion 25a of the side sill 25 at its front end in the vehicle front-rear direction.

Figure 4B:
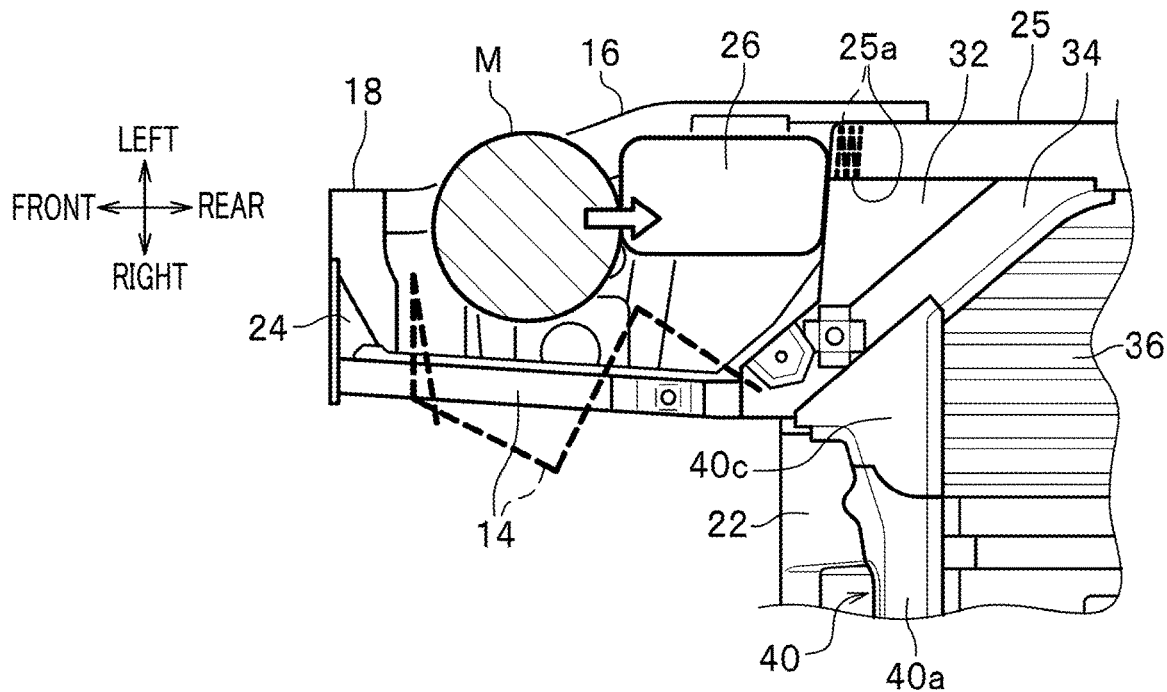
FIG. 4B is a partially enlarged bottom view showing the movement in the case of a small overlap collision and also showing the positional relationship in the vehicle width direction.

With the positional relationship in the vehicle width direction as described above in this embodiment, in the case of a small overlap collision (narrow offset collision), the load receiving portions (the lower member 18 and the gusset 24), in the initial stage of the collision, transmit the collision load to the front side frames 14, bending and deforming the front side frame 14, which absorbs the collision load (see FIG. 4A). Further, in the latter stage of the collision, when a collision object M collides with the front wheel 26, the front wheel 26 hits the front end portion in the vehicle front-rear direction of the side sill 25. The front wheel 26 hitting the side sill 25 crushes the front end portion in the vehicle front-rear direction of the side sill 25, absorbing the collision load (see FIG. 4B). Note that in the initial stage of the collision, the lower member 18 deforming the upper member 16 absorbs the collision load.

As above in this embodiment, in the case of a small overlap collision, the deformation of the front side frame 14 in the initial stage of the collision and the crush of the side sill 25 in the latter stage of the collision absorb the collision load continuously from the initial stage to the latter stage of the collision. Consequently, in the case of a small overlap collision, the structure in this embodiment absorbs a larger amount of the collision load and has an improved absorption efficiency of the collision load. As a result, the structure in this embodiment suitably protects the battery (not shown) disposed on the floor from the collision load and can be suitably applied to the electric automobile 10.

Figure 14A:
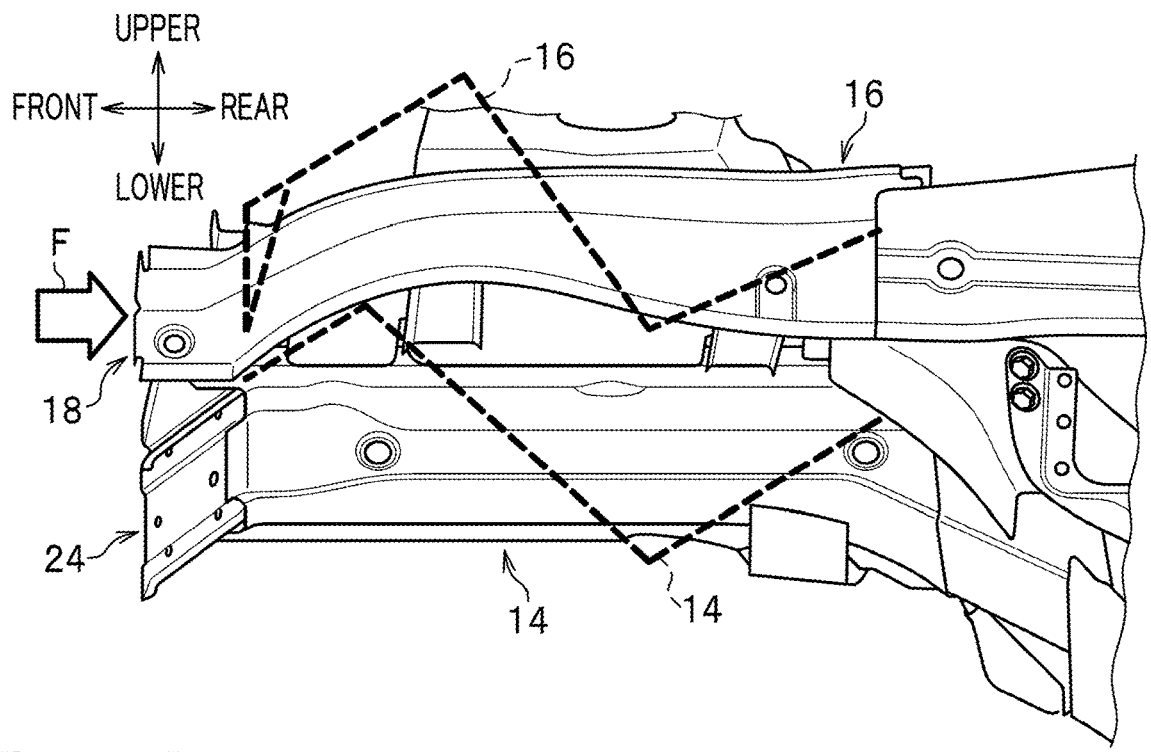
FIG. 14A is an explanatory diagram for the case where the load receiving portion is the lower member.
Figure 14B:
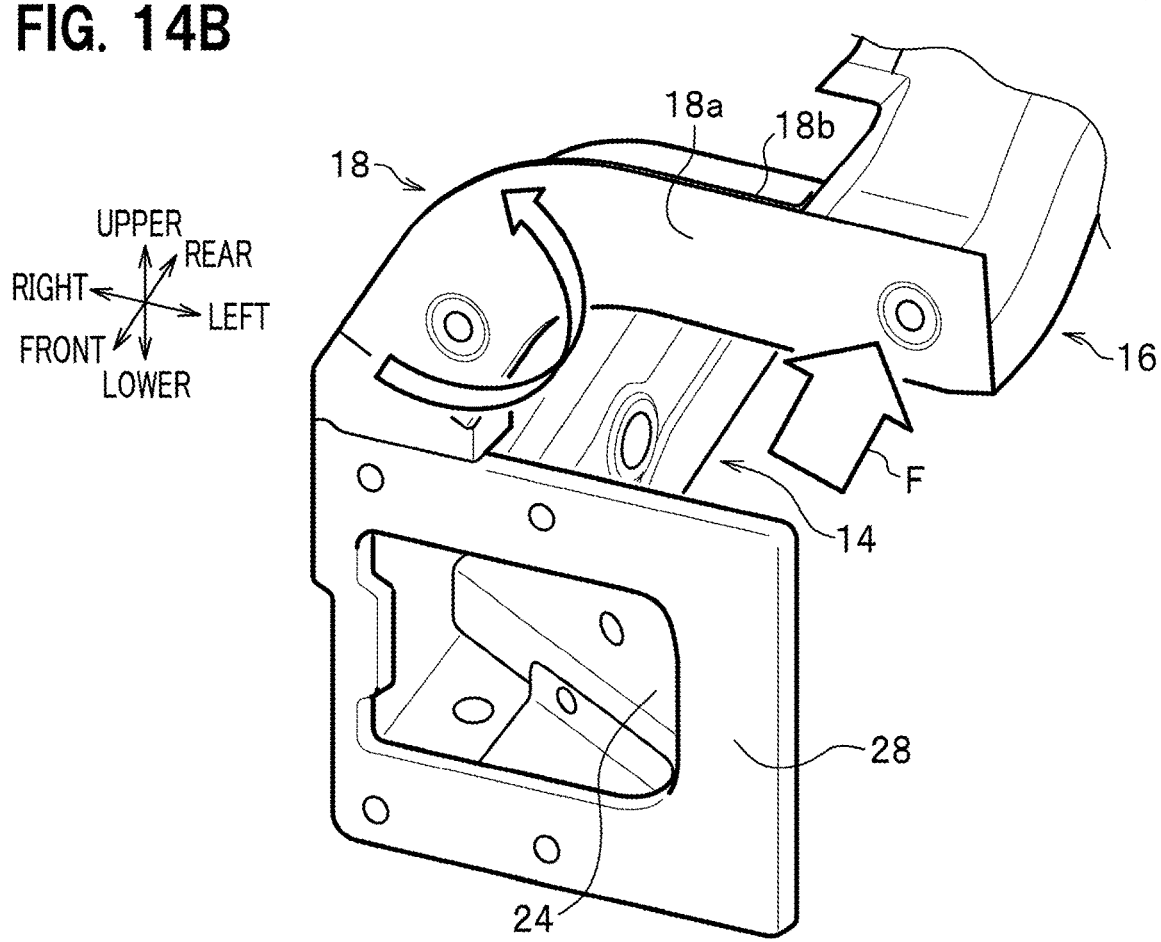
FIG. 14B is an explanatory diagram for the case where the load receiving portion is the lower member.

As shown in FIGS. 14A and 14B, in the case where the load receiving portion is each lower member 18 in this embodiment, an inputted collision load F twists and deforms the lower member 18 in the arrow direction (see FIG. 14B), and then, the collision load F bends and deforms the front side frame 14, and the deformation of the front side frame 14 absorbs the collision load F. In other words, the collision load F inputted to the lower member 18 is transmitted from the lower member 18 to the front side frame 14 as a force in a torsional direction. Since the length of the part, outward in the vehicle width direction of the front side frame 14, of the lower member 18 is longer than that of the gusset 24; even when the length by which the collision object and the electric automobile 10 are overlapped in the vehicle width direction is small, the collision load F can be transmitted efficiently to the front side frame 14.

In addition, the lower member 18 is coupled to the front end portion in the vehicle front-rear direction of the upper member 16 and also coupled to the front end portion in the vehicle front-rear direction of the front side frame 14. This allows the collision load F inputted to the lower member 18 to deform the upper member 16 and the front side frame 14 such that the upper member 16 and the front side frame 14 work cooperatively (coordinately). As a result, the upper member 16 and the front side frame 14 absorb the collision load F efficiently.

Figure 15A:
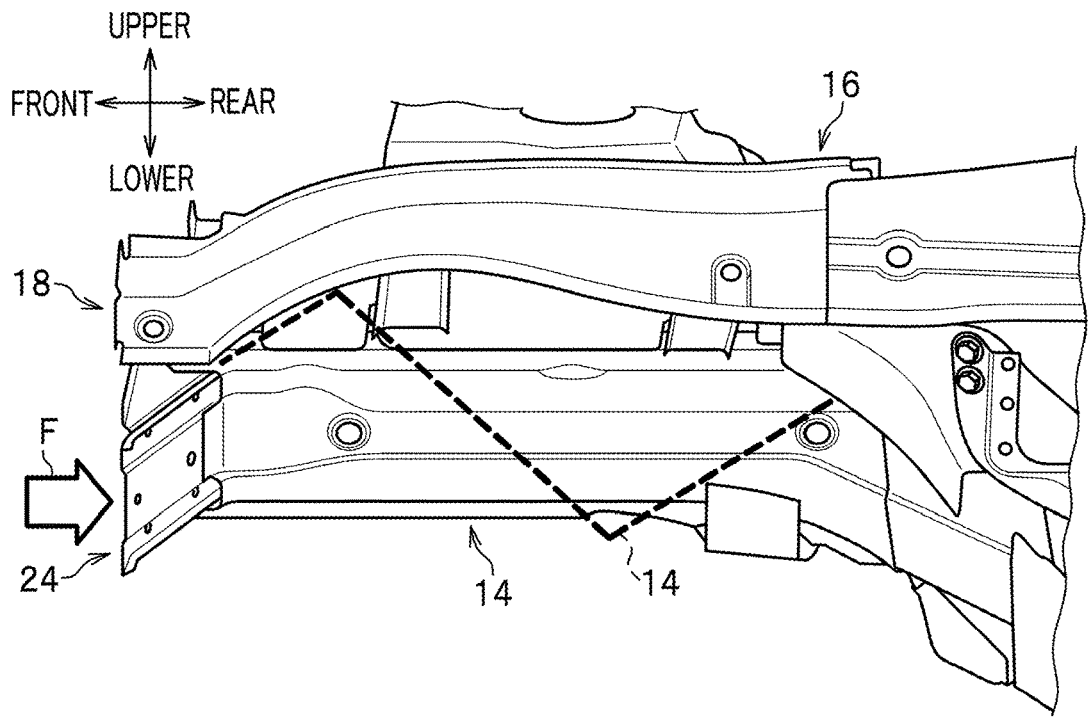
FIG. 15A is an explanatory diagram for the case where the load receiving portion is the gusset.
Figure 15B:
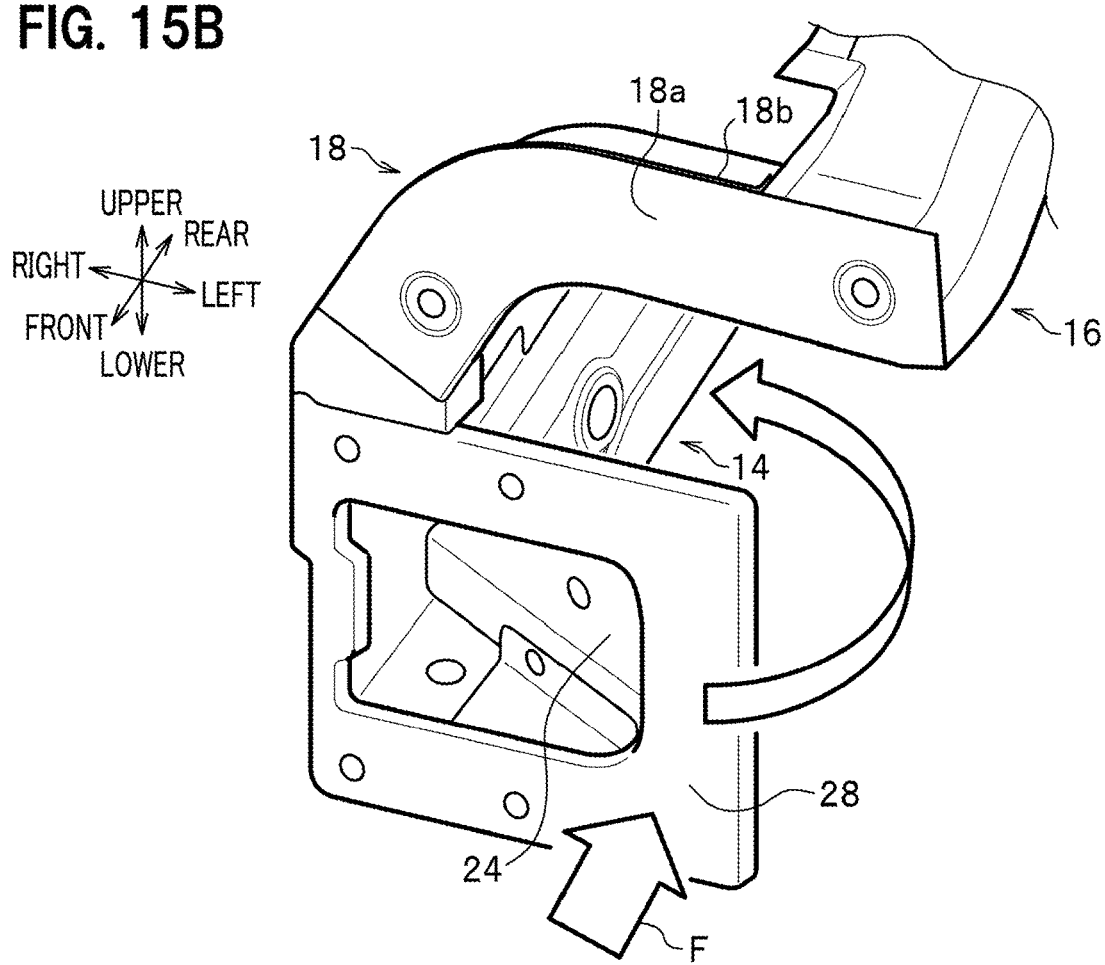
FIG. 15B is an explanatory diagram for the case where the load receiving portion is the gusset.

As shown in FIGS. 15A and 15B, in the case where the load receiving portion is the gusset 24 in this embodiment, a collision load F inputted to the gusset 24 can be directly transmitted to the front side frame 14 as a force in a bending direction. As a result, in this embodiment, the collision load F inputted to the gusset 24 can be absorbed efficiently.

Note that although in this embodiment, description has been provided separately for the case where the load receiving portion is each lower member 18 (FIGS. 14A and 14B) and for the case where the load receiving portion is the gusset 24 (FIGS. 15A and 15B), this embodiment is not limited to these cases. This embodiment also includes the case where the load receiving portions are both the pair of right and left lower members 18, 18 and the gussets 24 bonded to the inner walls of the front side frame 14.

Further in this embodiment, the tunnel cross member 40, the pair of right and left second outriggers 34, 34, and the pair of right and left first outriggers 32, 32 are disposed between, along the vehicle width direction, the front ends in the vehicle front-rear direction of the pair of right and left side sills 25, 25 and connect the front ends in the vehicle front-rear direction of the pair of right and left side sills 25, 25.

In this embodiment, this structure, in the case of an offset collision, allows the collision load to be transmitted from the front side frame 14 via the second outrigger 34 to the side sill 25. In the case of an oblique collision in this embodiment, the front end portions in the vehicle front-rear direction of the first outrigger 32 and the side sill 25 are crushed, absorbing the collision load. At the same time, the collision load inputted in the oblique collision can be transmitted to the opposite (the other) side sill 25 from the collision side because the tunnel cross member 40 having a higher rigidity than the first outriggers 32 is linked linearly between the side sills 25 via the second outriggers 34. As a result, in this embodiment, the battery (not shown) stored in the battery storing portion 12b can be protected from the collision load efficiently.

Further in this embodiment, at the connected portions between the floor tunnel 44 and the floor panels 36 are disposed in parallel the pair of right and left tunnel frames 50, 50 extending linearly along the vehicle front-rear direction. In addition, in this embodiment, the front end portion 50c in the vehicle front-rear direction of each tunnel frame 50 is positioned above the cross center portion 40a of the tunnel cross member 40 and fixed to the cross center portion 40a.

This structure in this embodiment, in the case of a head-on collision and an offset collision, allows a collision load inputted from the load receiving portion to be transmitted from the front side frames 14 via the tunnel cross member 40 to the tunnel frames 50. As a result, in this embodiment, the collision load inputted from the load receiving portion can be distributed to the tunnel frames 50 efficiently via the tunnel cross member 40.

Furthermore, in this embodiment, the tunnel cross member 40 has a hat-shaped cross section perpendicular to its axis, and the front flange portion 41d in the vehicle front-rear direction of the tunnel cross member 40 extends obliquely upward along the dash lower panel 22 and fixed to the inclined face portions 50a of the tunnel frames 50. The rear flange portion 41e in the vehicle front-rear direction of the tunnel cross member 40 is fixed to the lower face portions 50b, which are flat, of the tunnel frames 50.

This structure in this embodiment, in the case of a head-on collision and an offset collision, allows the collision load inputted from the load receiving portion to be transmitted from the front side frame 14 to the tunnel cross member 40 efficiently.

Furthermore, in this embodiment, above the second outrigger 34 in the vehicle up-down direction is disposed the dash cross member 46 extending in parallel with the second outrigger 34 in the up-down direction, and the dash cross member 46 is fixed to the dash lower panel 22.

This structure in this embodiment, in the case of a head-on collision and an offset collision, allows the collision load to be transmitted from the front side frame 14 via the second outrigger 34 to the side sill 25 on one side and also allows the collision to be transmitted via the dash cross members 46 to the side sill 25 on the other side. As a result, the collision load can be efficiently delivered and transmitted in this embodiment.

Furthermore, in this embodiment, the outer flange 34a in the vehicle width direction of the second outrigger 34 and the lower flange 46a in the vehicle up-down direction of the dash cross member 46 are overlapped in the vehicle width direction via the dash lower panel 22, and both are attached to the dash lower panel 22.

This structure in this embodiment allows an oblique collision load inputted when a collision object collides with the vehicle in an oblique direction to be transmitted efficiently from the second outrigger 34 to the tunnel cross member 40.

Furthermore, in this embodiment, the floor panel 36 has the beads 38 extending in the vehicle front-rear direction, and the dash lower panel 22 has the beads 48 extending radially from the rear end portions in the vehicle front-rear direction of the front side frames 14 toward the front end portions in the vehicle front-rear direction of the floor panels 36.

The beads 38 and the beads 48 formed as above improve the rigidity and strength of the floor panels 36 and the dash lower panel 22, respectively, in this embodiment. In addition, in this embodiment, the collision load inputted in the case of an offset collision and a head-on collision is transmitted along the directions in which the beads 38 and 48 extend, delivering the collision load efficiently (see FIG. 12).

What is claimed is:

1. A vehicle body structure comprising:
a pair of front side frames disposed on a front side of a vehicle to be in parallel with each other along a vehicle front-rear direction;
load receiving portions disposed at front ends in the vehicle front-rear direction of the respective front side frames so as to extend outward in a vehicle width direction;
front wheels disposed outward in the vehicle width direction of the respective front side frames; and
a pair of right and left side sills disposed rearward in the vehicle front-rear direction of the respective front wheels so as to extend in the vehicle front-rear direction, wherein
vehicle-width-direction outer end portions of the load receiving portions are positioned outward in the vehicle width direction of vehicle-width-direction inner end portions of the respective front wheels,
vehicle-width-direction outer end portions of the front wheels are positioned outward in the vehicle width direction of vehicle-width-direction inner end portions of front ends in the vehicle front-rear direction of the respective side sills,
the load receiving portions are a pair of right and left lower members, and
each lower member has an L shape in front view, extends upward from a front end in the vehicle front-rear direction of the corresponding front side frame and then outward in the vehicle width direction, and is bonded to a front end in the vehicle front-rear direction of an upper member extending forward from a front pillar.

2. The vehicle body structure according to claim 1, wherein
the load receiving portions are the pair of right and left lower members and gussets bonded to inner walls of the respective front side frames.

3. The vehicle body structure according to claim 1, further comprising:
a tunnel cross member extending linearly along the vehicle width direction;
a pair of right and left second outriggers extending obliquely rearward linearly from rear end portions in the vehicle front-rear direction of the respective front side frames to inner sides in the vehicle width direction of the respective side sills; and
a pair of right and left first outriggers disposed forward in the vehicle front-rear direction of the second outriggers, wherein
front end portions in the vehicle front-rear direction of the second outriggers are coupled to the rear end portions in the vehicle front-rear direction of the front side frames, and rear end portions in the vehicle front-rear direction of the second outriggers are coupled to inner walls in the vehicle width direction of the side sills, and
the tunnel cross member, the pair of right and left second outriggers, and the pair of right and left first outriggers are disposed between, along the vehicle width direction, front end portions in the vehicle front-rear direction of the pair of right and left side sills, and connect the front end portions in the vehicle front-rear direction of the pair of right and left side sills.

4. The vehicle body structure according to claim 3, wherein
a pair of right and left tunnel frames extending linearly are disposed at connecting portions between a floor tunnel extending in the vehicle front-rear direction and floor panels extending in the vehicle front-rear direction, and
front end portions in the vehicle front-rear direction of the tunnel frames are positioned on top of the tunnel cross member and fixed to the tunnel cross member.

5. The vehicle body structure according to claim 4, wherein
the tunnel cross member has a hat-shaped cross section perpendicular to an axis of the tunnel cross member,
the tunnel frames each have an L-shaped cross section perpendicular to an axis of the tunnel frame,
a front flange in the vehicle front-rear direction of the tunnel cross member extends obliquely upward along a dash lower panel and is fixed to the tunnel frames, and
a rear flange in the vehicle front-rear direction of the tunnel cross member is fixed to the tunnel frames.

6. The vehicle body structure according to claim 3, wherein
dash cross members extending in parallel in a vehicle up-down direction with the second outriggers are disposed above the second outriggers in the vehicle up-down direction, and
the dash cross members are fixed to a dash lower panel.

7. The vehicle body structure according to claim 6, wherein
an outer flange in the vehicle width direction of each second outrigger and a lower flange in the vehicle up-down direction of a corresponding one of the dash cross members are overlapped in the vehicle width direction via the dash lower panel, and both the outer flange in the vehicle width direction of the second outrigger and the lower flange in the vehicle up-down direction of the dash cross member are fixed to the dash lower panel.

8. The vehicle body structure according to claim 5, wherein
the floor panels each have beads extending in the vehicle front-rear direction, and
the dash lower panel has beads extending radially from the rear end portions in the vehicle front-rear direction of the front side frames toward front end portions in the vehicle front-rear direction of the floor panels.

* * * * *